United States Patent
Ginsberg et al.

(10) Patent No.: US 12,427,553 B2
(45) Date of Patent: Sep. 30, 2025

(54) METHOD AND SYSTEM FOR REMOVING PET HAIR

(71) Applicant: Ellie Ginsberg, New York, NY (US)

(72) Inventors: Ellie Ginsberg, New York, NY (US); Muhammad Salaman Habib, Lahore (PK); Malik Ahsan Maqsood, Attock (PK)

(73) Assignee: Ellie Ginsberg, New York, NY (US)

( * ) Notice: Subject to any disclaimer, the term of this patent is extended or adjusted under 35 U.S.C. 154(b) by 214 days.

(21) Appl. No.: 18/342,333

(22) Filed: Jun. 27, 2023

(65) Prior Publication Data
US 2024/0342764 A1     Oct. 17, 2024

Related U.S. Application Data

(60) Provisional application No. 63/496,550, filed on Apr. 17, 2023.

(51) Int. Cl.
*B08B 7/00*     (2006.01)
*C09J 175/16*   (2006.01)

(52) U.S. Cl.
CPC .......... *B08B 7/0028* (2013.01); *B08B 7/0014* (2013.01); *C09J 175/16* (2013.01)

(58) Field of Classification Search
CPC .... B08B 7/0028; B08B 7/0014; C09J 175/16; C09J 175/04; C08G 18/73; C08G 18/755; C08G 18/7621; C08G 18/7671
See application file for complete search history.

(56) References Cited

U.S. PATENT DOCUMENTS

| | | | |
|---|---|---|---|
| 4,990,192 A | | 2/1991 | Pallone et al. |
| 5,505,787 A | * | 4/1996 | Yamaguchi ............. A47L 11/38 134/4 |
| 7,108,440 B1 | | 9/2006 | Gruenbacher et al. |
| 2009/0025851 A1 | * | 1/2009 | Huck ....................... C11D 7/14 156/60 |
| 2016/0015178 A1 | * | 1/2016 | Alshady ................ B29C 41/003 222/251 |
| 2018/0312655 A1 | * | 11/2018 | Hupka ..................... C08J 9/149 |

FOREIGN PATENT DOCUMENTS

| | | | | |
|---|---|---|---|---|
| GB | 2 189 983 A | | 11/1987 | |
| WO | WO-2008155078 A1 | * | 12/2008 | ........... B08B 7/0014 |

OTHER PUBLICATIONS

Machine translation of WO-2008155078-A1 (Year: 2008).*
Magic Static Remover, <https://www.magicfabriccare.com/products/magic-static-remover/>, access on Jan. 30, 2023.

* cited by examiner

*Primary Examiner* — Erin F Bergner
(74) *Attorney, Agent, or Firm* — Gottlieb, Rackman & Reisman, PC

(57) ABSTRACT

A new product, method and system for the removal of pet hair from fabric, furniture and other household items is provided. The inventive system utilizes a non-aerosol, non-toxic, light adhesive spray product that is formulated so that it sticks to pet hair. When applied and set, the spray product enables one to easily ball up the pet hair that is located on fabric, furniture and other household items using one's hand, a rag, or a squeegee. As a result, disposal of unwanted pet hair is easily achieved, thereby leaving the surfaces of fabric, furniture and other household items free of pet hair.

2 Claims, 3 Drawing Sheets

METHOD AND SYSTEM FOR REMOVING PET HAIR

FIELD OF INVENTION

This application claims priority to U.S. Provisional Application No. 63/496,550 filed on Apr. 17, 2023, which is hereby incorporated by reference.

This invention relates to an improved method and system for the removal of pet hair from fabric, furniture and other household items.

BACKGROUND OF THE INVENTION

Current solutions for pet-hair removal from fabric, furniture and other household items are time and labor intensive and therefore are less than desirable. These include manual hair removal tools, manual rolls of peel-off, sticky paper aka "lint rollers", bulky vacuum cleaners with associated attachments, and the use of a separate cloth, wet or dry. Such prior art methods are disadvantageous.

For example, manual tools only remove hair from small areas at a time, with frequent hair extraction required to clear the tool. Rolls of sticky paper are less than desirable as they only remove the top layer or pet hair, and multiple passes with many, many papers are usually required; this results in a waste of time, money and paper.

While using a vacuum cleaner can be somewhat effective, even with the proper tools, using a vacuum cleaner is bulky, heavy and often times confusing. One other option is to use a rag and water, but doing is so is rather ineffective in cleaning fabric furniture as it is both labor intensive and the water might stain the furniture.

Accordingly, it would be desirable to have a method and system for the removal of pet hair from fabric, furniture and other household items that is an improvement for prior art methods and systems.

SUMMARY OF THE INVENTION

Generally speaking, in accordance with the invention, a new product, method and system for the removal of pet hair from fabric, furniture and other household items is provided. The inventive system utilizes a non-aerosol, non-toxic, light adhesive spray product that is formulated so that it sticks to pet hair. When applied and set, the spray product enables one to easily ball up the pet hair that is located on fabric, furniture and other household items using one's hand, a rag, or a squeegee. As a result, disposal of unwanted pet hair is easily achieved, thereby leaving the surfaces of fabric, furniture and other household items free of pet hair.

Accordingly, it is an object of the invention to provide a new method and system for removing pet hair from fabric, furniture and other household items.

Still another object of the invention is to provide a new system and product for removing pet hair from fabric, furniture and other household items that utilizes a non-toxic spray product.

A further object of the invention is to provide a new method for removing pet hair from fabric, furniture and other household items that will not damage or harm the fabric or wood of household furniture.

Yet another object of the invention is to provide a new method for removing pet hair from fabric, furniture and other household items that is easy to carry out.

Still other objects and advantages of the invention will become apparent from the following description.

BRIEF DESCRIPTION OF THE DRAWINGS

Reference is made to the following drawings in which.

DETAILED DESCRIPTION

Figure 1:
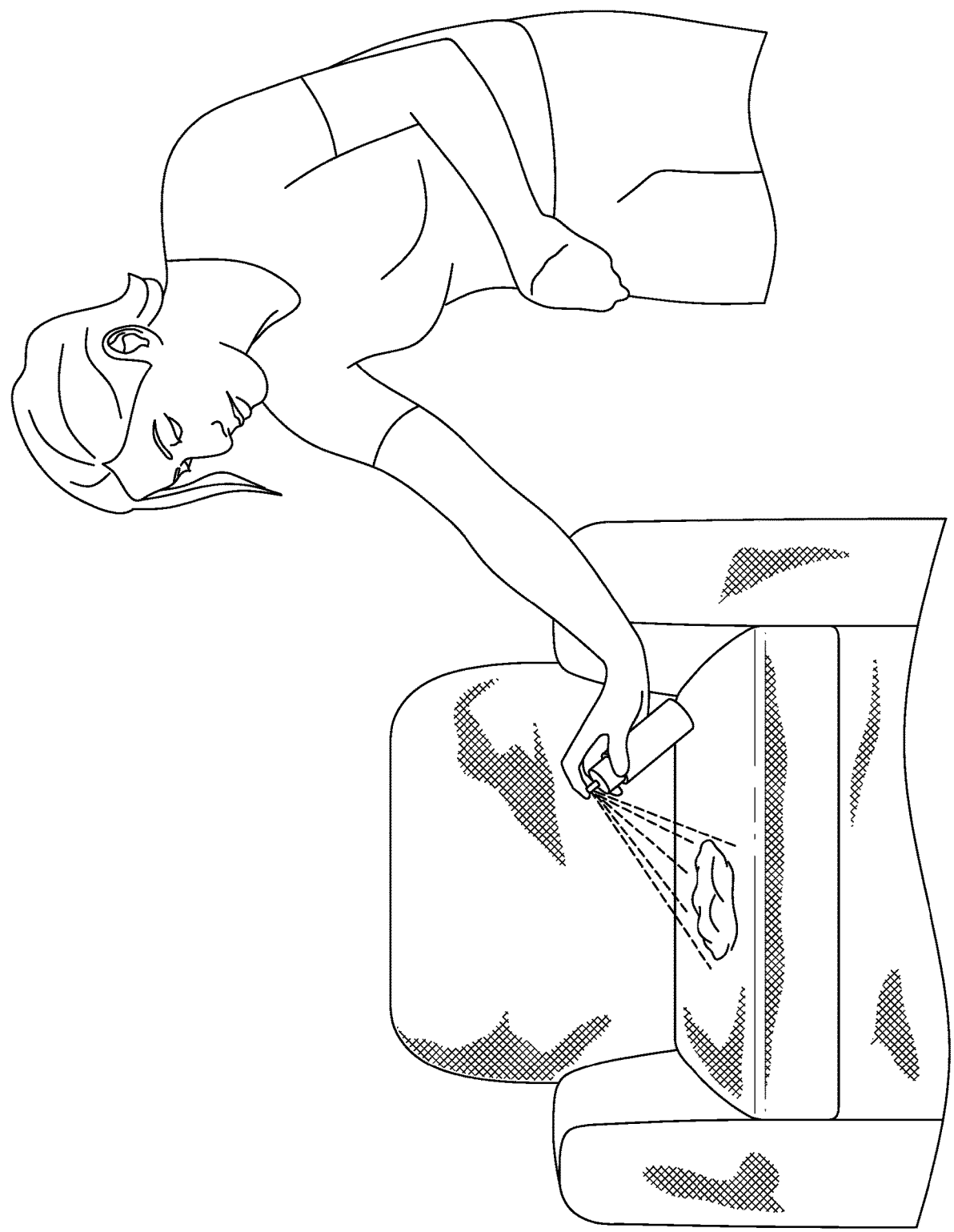
FIG. 1 depicts the application of the spray product composition of the invention to pet hair located on the fabric surface of a chair.

The present invention provides a novel method for removing pet hair from fabric, furniture and other household items. The method consists of the application of a light adhesive spray product to the pet hair. The adhesive spray product is formulated so that it sticks to and sets on the pet hair, allowing the fabric or furniture product with adhered pet hair to ball up for easy removal.

The spray product composition of the invention includes an adhesive in a preferred amount of between about 5 and 10 weight percent of the overall composition. The purpose of the adhesive is to facilitate bonding of the solvent and reagent ingredients. The preferred adhesive is methylene diphenyl diisocyanate (MDI) in an amount between about 6 and 8 weight percent of the overall composition. Alternatively, other diisocyanates such as toluene diisocyanate (TDI), hexamethylene diisocyanate (HDI) and isophorone diisocyanate may be used.

The spray product composition of the invention also includes a wax compound as a thickener in a preferred amount of between about 7 and 12 weight percent of the overall composition. The purpose of the thickener is to increase the viscosity of the spray product composition and should be added slowly when preparing the composition. When added, the resulting composition will be more polymeric. The preferred wax thickener is polyamide wax in an amount between about 7 and 9 weight percent. Alternatively, the thickener may be selected from PTFE (polytetrafluoroethylene) waxes, beeswax, citrine clear wax polyamide (distributed by TKB Trading of Oakland, California) and cold liquid wax for Batik (available from Aubijoux La Soie of Belgium).

An additive may be included in the spray product composition of the invention in an amount of between about 10 and 15 weight percent of the overall composition. The purpose of the additive is to enhance the formability, performance and consistency of the spray product composition, thereby increasing the composition's shelf life. The preferred additive is polymethyl methacrylate (PMMA) in an amount between about 11 and 13 weight percent. Alternatively, the additive may be selected from polyvinyl pyrrolidone, polyvinyl alcohol, Cerement (manufactured by BoneSupport AB of Sweden) and polyethylene glycol.

The spray product composition must include one or more solvents; the one or more solvents are preferably present in the composition in an amount between about 40 and 70 weight percent. The preferred solvents are ethanol as the primary solvent and ethyl acetate as the supporting solvent; they are preferably present together in the composition and more preferably in an overall amount between about 52 and 59 weight percent.

The primary solvent is included in the spray product composition in a preferred amount between about 40 and 55 weight percent. The primary solvent serves as the ingredient into which the other ingredients are mixed. In addition, the primary solvent keeps the composition from drying out. Further, when the composition is sprayed during use, the primary solvent volatilizes in order to facilitate spreading of the composition on the fabric or furniture surface, thereby making the composition easier to remove. The supporting solvent is included in the spray product composition in a preferred amount between about 8 and 15 weight percent. The supporting solvent functions similarly to the primary solvent, but is also added to the spray product composition to facilitate dissolving the additive component, which is preferably PMMA as described above.

Both ethanol and ethyl acetate are included together in the composition as solvents, with ethanol present as the primary solvent and preferably being in the composition in an amount between 40 and 45 weight percent, and ethyl acetate as the supporting solvent and preferably being in the composition in an amount between about 12 and 14 weight percent. Alternatively, instead of ethanol as the primary solvent, the primary solvent may be selected from one or more of methanol, acetone, ethyl-3 ethoxypropionate, isopropyl alcohol and Safeco (manufactured by Eco-Point International BV of Sweden). Alternatively, instead of ethyl acetate as the supporting solvent, the supporting solvent may be selected from propylene glycol, chlorinated olefin, piperylene sulfone and dichloromethane.

A reagent component may be included in the spray product composition in an amount between about 10 and 18 weight percent of the overall composition. The reagent is included in order to create a film on the surface of the composition and to help with the dissolution of the solvents. It also helps to prevent both coagulation and drying out of the composition. Ethanoic anhydride is the preferred reagent; more preferably, it may be present in the composition in an amount between about 13 and 17 weight percent. Other reagents that may instead be used include acetic anhydride (ethanoic anhydride), acetic acid, ethyl 2-cyano-2-(hydroxyimino) acetate and xylene.

A preferred spray product formulation is as follows:

| Chemical Name | % Composition |
| --- | --- |
| Methylene diphenyl diisocyanate (MDI) | 7.0 |
| Polyamide wax | 8.5 |
| Polymethyl methacrylate (PMMA) | 12.5 |
| Ethanol | 43.0 |
| Ethyl acetate | 13.0 |
| Ethanoic anhydride | 16.0 |
| TOTAL | 100.0 |

In order to prepare the spray product formulation of the invention, a conventional beaker or other type of container is selected and ensured to be free of moisture and impurities. The ethanol and ethyl acetate solvent components are added to the beaker and mixed. Then, the methylene diphenyl diisocyanate, PMMA, polyamide wax and ethanoic anhydride components are added to the mixed solvents at a temperature of between about 28 and 35 degrees Celsius and mixed together using a non-magnetic stirrer. All components should preferably be in liquid form.

Figure 2:
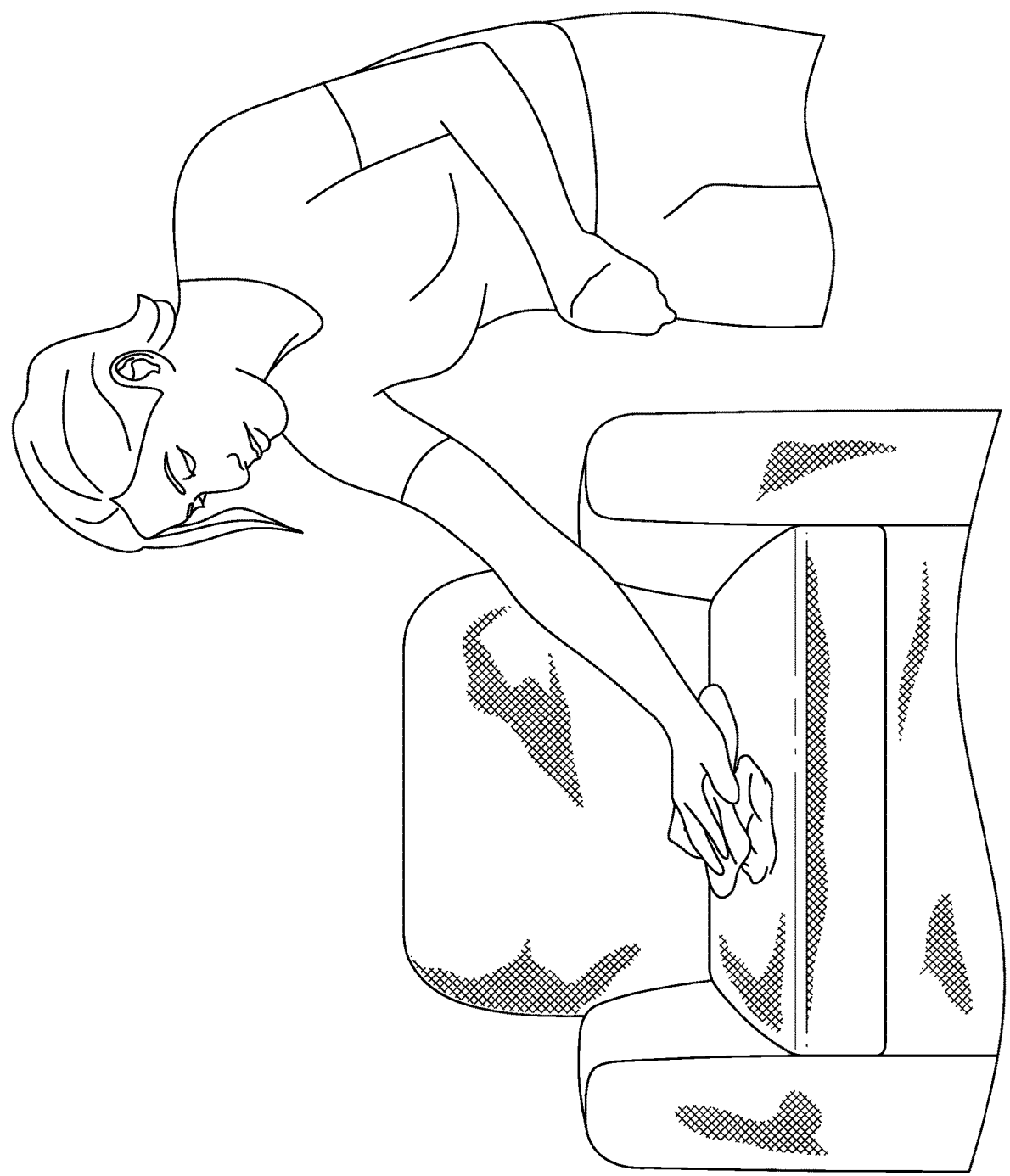
FIG. 2 depicts the coagulated hair and spray product composition being balled up for removal from the fabric surface of a chair.
Figure 3:
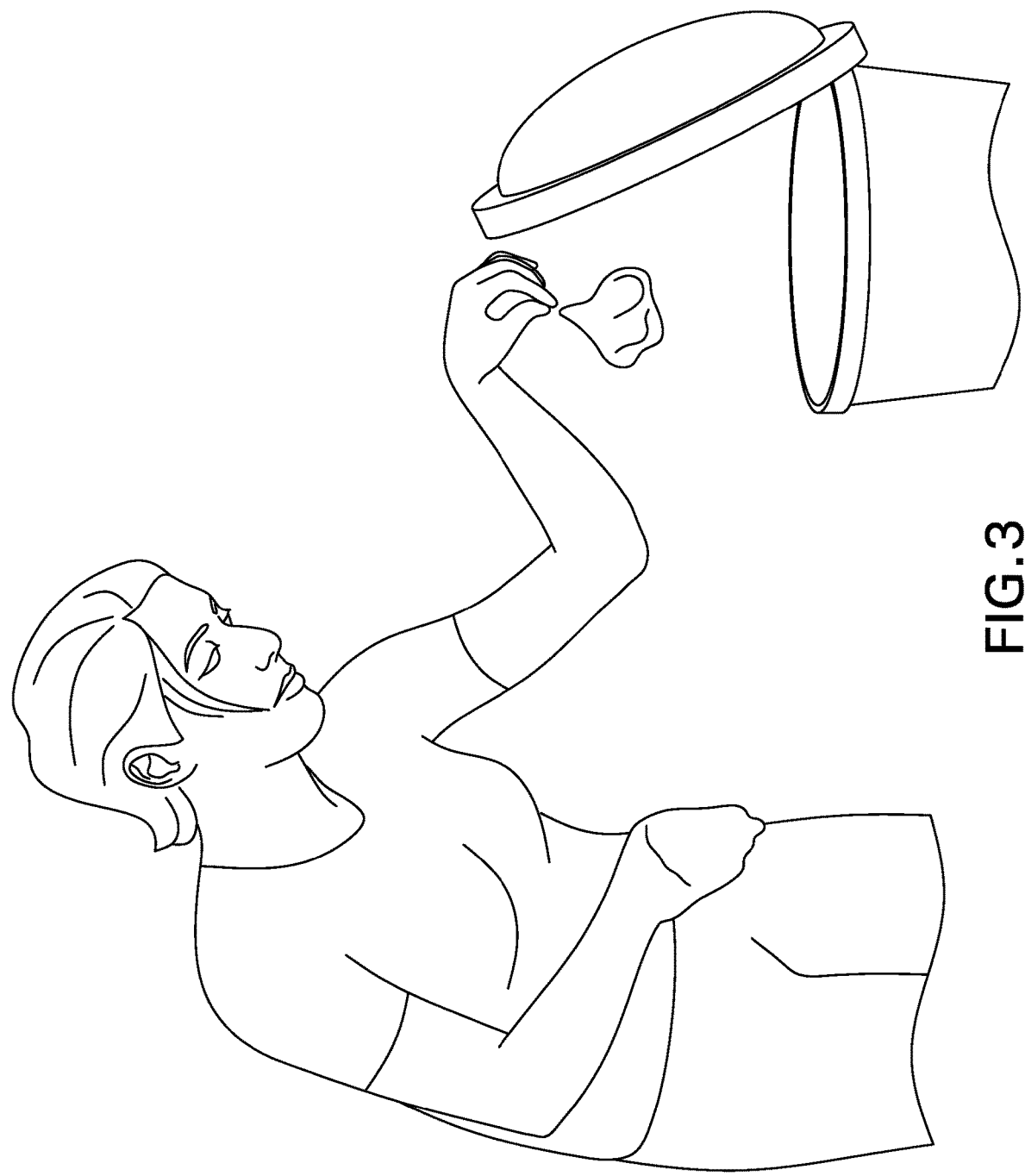
FIG. 3 depicts the balled up coagulated hair and spray product composition being tossed away into the garbage.

The spray product composition of the invention, in use, will stick to pet hair that is found on fabric, furniture and other household items. In use, the spray product formulation is sprayed on the surface of fabric or furniture utilizing a conventional spray bottle. As shown in FIG. 1, the formulation is sprayed directly where pet hair is found on the fabric or furniture and allowed to set/dry for between about 5 and 10 seconds. Once the composition is applied to pet hair, the coagulated product with the hair will peel and roll up for easy disposal, as shown in FIG. 2, leaving the surface of the fabric or furniture free of pet hair. The coagulated product with the hair, as shown in FIG. 3, is then thrown away in the garbage.

As can be appreciated, the spray product composition of the invention will start to dry once it is sprayed and hits the air, then lands on and coats the fabric or furniture surface, and within seconds is sufficiently tacky so that one is ready to roll up the captured/coagulated hair.

The inventive product, system and method is advantageous since it effectively removes and eliminates pet hair from fabric, furniture and other household items with significantly less time and effort than prior art prior art systems and methods.

The invention claimed is:

1. A method for the removal of hair that is found on a surface comprising the steps of applying a composition directly to the hair, allowing the composition to dry in order to form a coagulated mixture of composition and hair, and removing said coagulated mixture from said surface, the composition comprising methylene diphenyl diisocyanate (MDI) as an adhesive, a polyamide wax compound as a thickener, ethanol as a primary solvent, ethyl acetate as a supporting solvent, an additive comprising polymethyl methacrylate (PMMA), and a reagent component comprising ethanoic anhydride; wherein the adhesive is present in the composition in an amount between about 5 and 10 weight percent, the wax compound is present in the composition in an amount between about 7 and 12 weight percent, the primary solvent is present in the composition in an amount between about 40 and 55 weight percent, the supporting solvent is present in the composition in an amount between about 8 and 15 weight percent, the additive is present in the composition in an amount between about 10 and 15 weight percent, and the reagent is present in the composition in an amount between about 10 and 18 weight percent.

2. The method of claim 1, wherein the adhesive is present in the composition in an amount between about 6 and 8 weight percent, the wax compound is present in the composition in an amount between about 7 and 9 weight percent, the primary solvent is present in the composition in an amount between about 40 and 45 weight percent, the supporting solvent is present in the composition in an amount between about 12 and 14 weight percent, the additive is present in the composition in an amount between about 11 and 13 weight percent and the reagent is present in the composition in an amount between about 13 and 17 weight percent.

* * * * *